United States Patent [19]
Cardona et al.

[11] Patent Number: 5,481,420
[45] Date of Patent: Jan. 2, 1996

[54] DATA STORAGE DEVICE WITH REMOVABLE CARTRIDGE HAVING SHUTTER UNLOCKING AND DISK UNRESTRAINING ARRANGEMENTS

[76] Inventors: Joseph C. Cardona, 2395 W. Hedding St., San Jose, Calif. 95128; Michael C. McGrath, 3126 Malvasia Ct., Pleasanton, Calif. 94566

[21] Appl. No.: 973,945

[22] Filed: Nov. 9, 1992

[51] Int. Cl.⁶ .................. G11B 17/02; G11B 23/03
[52] U.S. Cl. .............. 360/99.06; 360/133; 369/77.2; 369/291
[58] Field of Search ................ 360/99.06, 99.07, 360/99.02, 99.03, 133; 369/77.2, 291

[56] References Cited

U.S. PATENT DOCUMENTS

| | | | |
|---|---|---|---|
| 4,614,990 | 9/1986 | Saito | 360/99.02 |
| 4,646,285 | 2/1987 | Ogusu et al. | 360/99.06 |
| 4,688,206 | 8/1987 | Nakagawa et al. | 360/133 |
| 4,791,515 | 12/1988 | Tanaka et al. | 360/133 |
| 4,794,479 | 12/1988 | Nakanishi | 360/133 |
| 4,797,770 | 1/1989 | Takahasi | 369/291 |
| 4,799,123 | 1/1989 | Kanazawa et al. | 360/133 |
| 4,858,050 | 8/1989 | Ashe et al. | 369/77.2 |
| 4,864,452 | 9/1989 | Thompson et al. | 360/133 |
| 4,908,817 | 3/1990 | Sandell et al. | 360/133 |
| 4,935,834 | 6/1990 | Muehlhausen | 360/133 |
| 4,965,685 | 10/1990 | Thompson et al. | 360/99.06 |
| 5,216,558 | 6/1993 | Griffith et al. | 360/99.06 |

FOREIGN PATENT DOCUMENTS

| | | | |
|---|---|---|---|
| 0218231 | 4/1987 | European Pat. Off. | 360/133 |
| 62-97186 | 5/1987 | Japan | 369/291 |
| 62-248182 | 10/1987 | Japan | 360/133 |

*Primary Examiner*—Stuart S. Levy
*Assistant Examiner*—Craig A. Renner

[57] ABSTRACT

An interface between a removable cartridge containing a rigid disk for storage of data and a disk drive. The cartridge includes a normally closed and locked pivoting arcuately shaped shutter to cover a disk access window and an opening for a hub of the disk for spinning. The disk drive includes a shutter opener arm for unlocking and opening the shutter as the cartridge is inserted therein, a magnetic spindle with connecting mechanism for extending the spindle into contact with the hub and retracting it out of contact, and an abutment surface to deactivate a disk immobilizer when the cartridge is inserted into the disk drive.

29 Claims, 10 Drawing Sheets

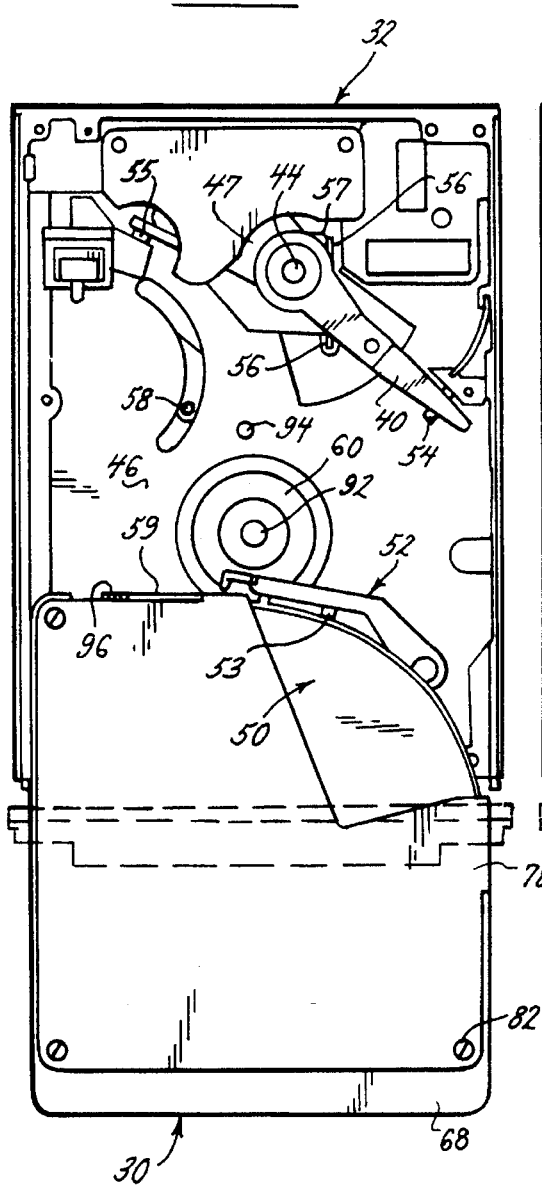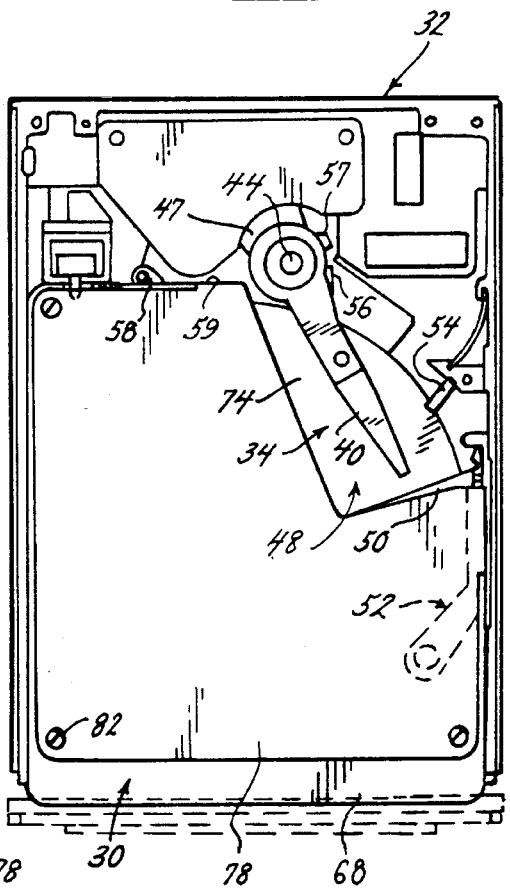

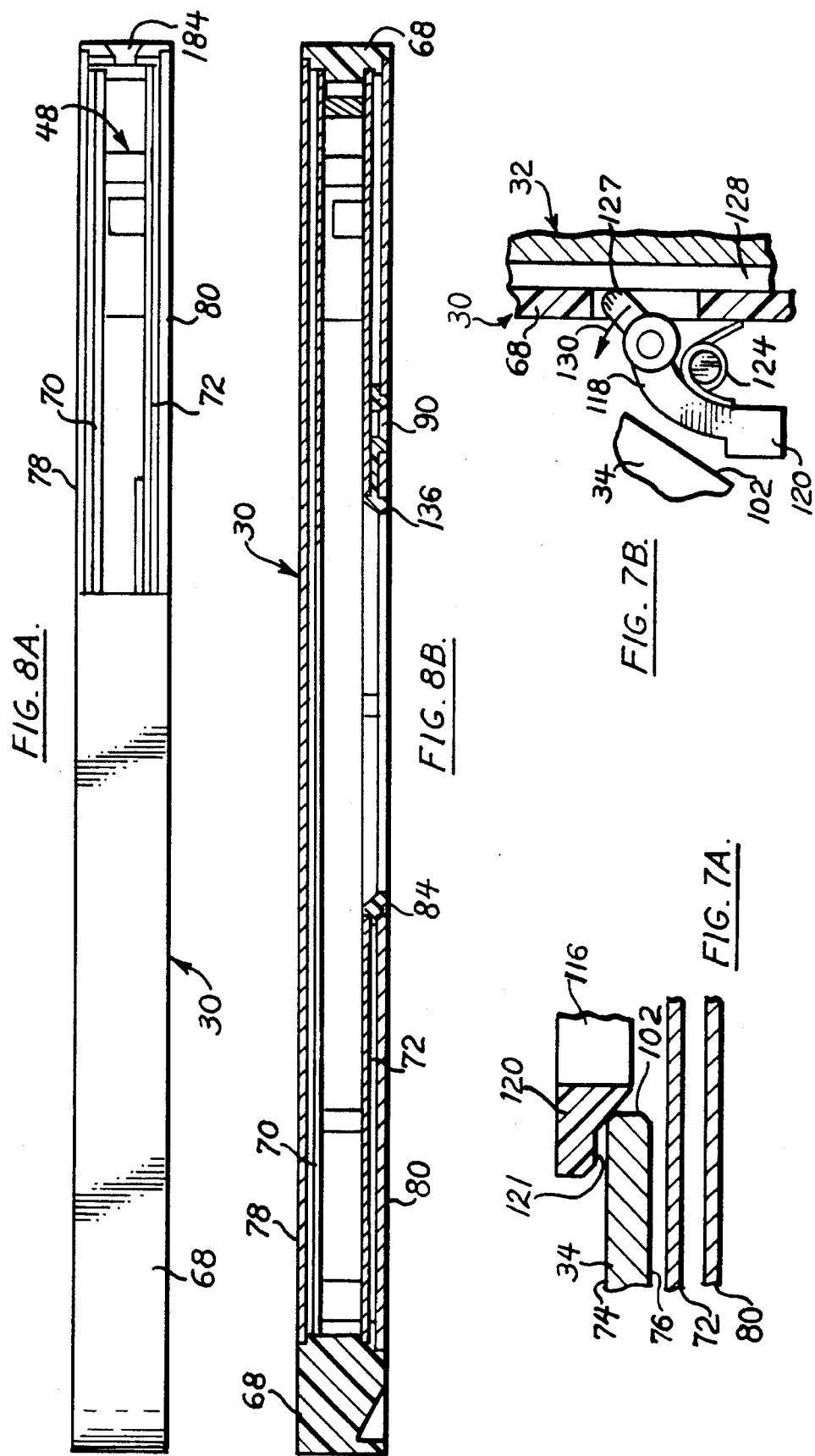

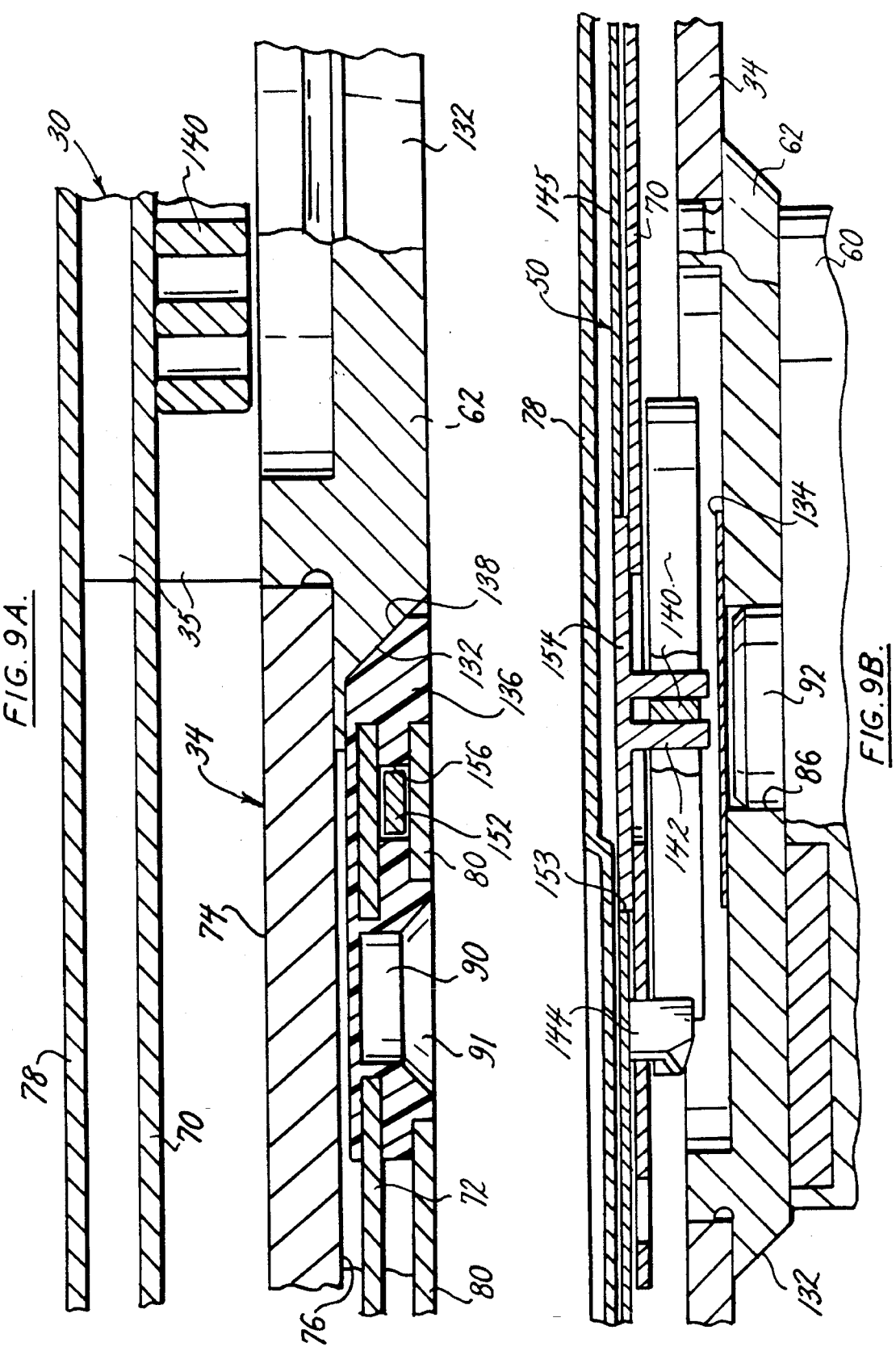

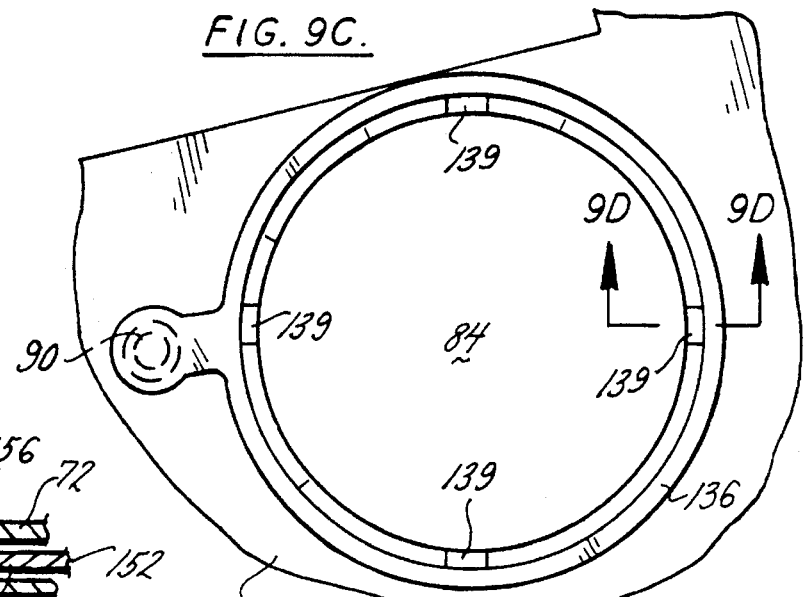
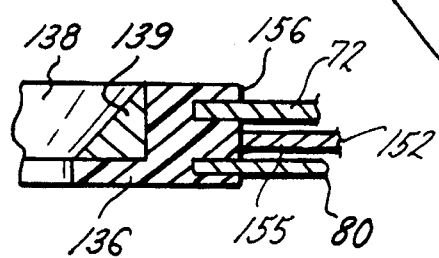
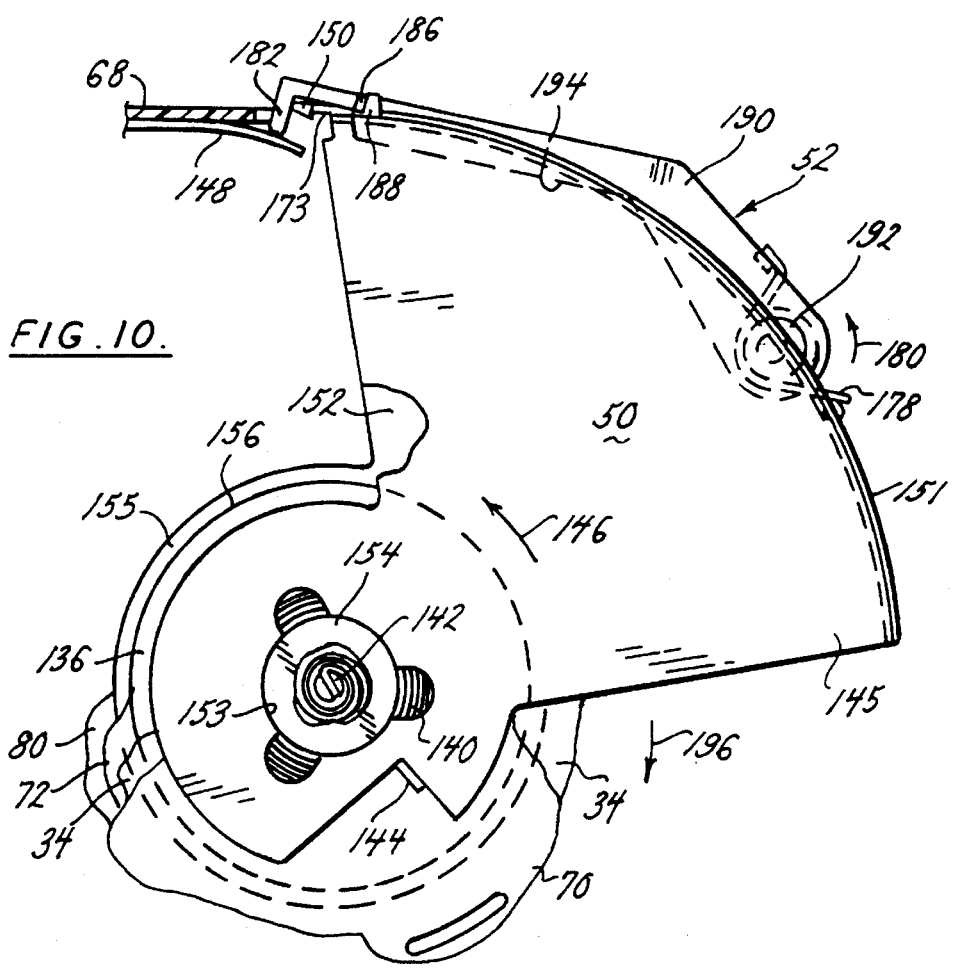

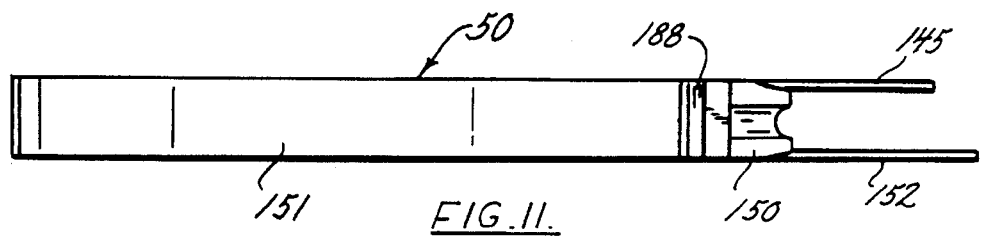
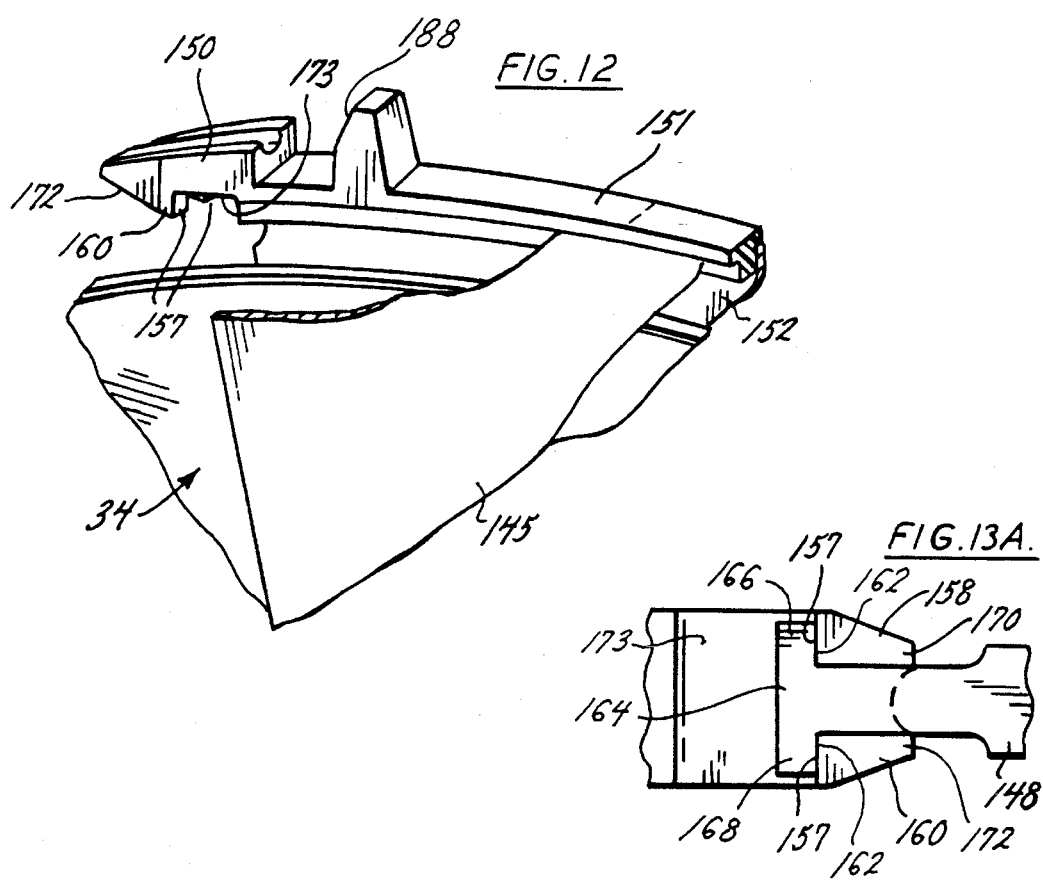
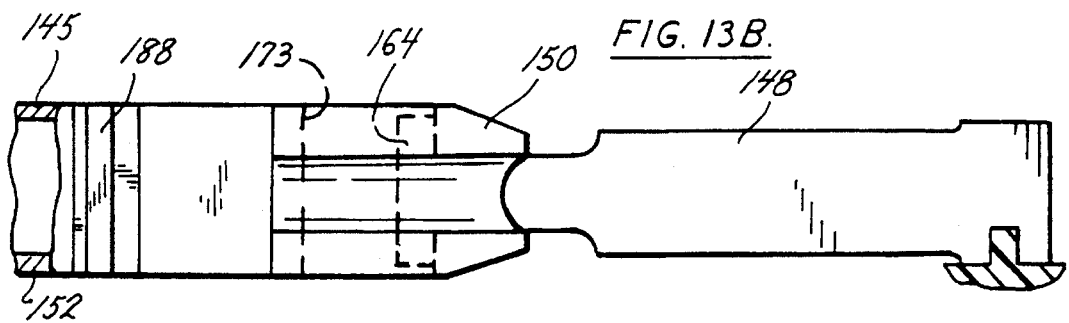

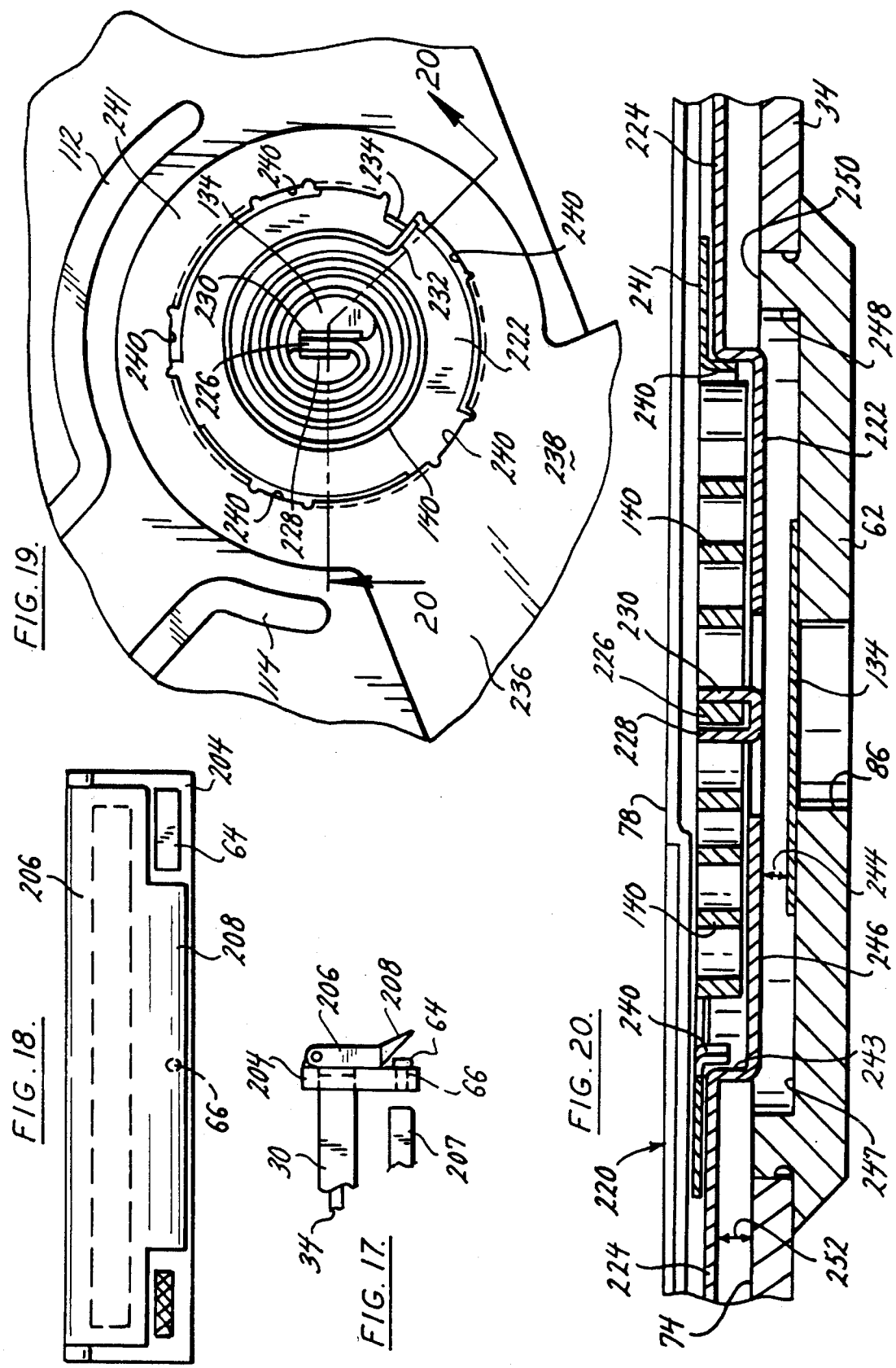

DATA STORAGE DEVICE WITH REMOVABLE CARTRIDGE HAVING SHUTTER UNLOCKING AND DISK UNRESTRAINING ARRANGEMENTS

FIELD OF THE INVENTION

The present invention relates to disk drives with removable cartridges containing relatively rigid media to store data in a personal computer.

BACKGROUND OF THE INVENTION

Removable disks included in protective cartridges have been available for some time. Generally, the protective cartridges include either a flexible disk or a relatively rigid disk. Typical flexible disk cartridges as shown in U.S. Pat. Nos. 4,445,155 to Takahashi, et al.; 4,445,157 to Takahashi; 4,546,397 to Asami, et al; 4,573,093 to Obama, et al; and 4,675,758 to Tanaka. Rigid disk cartridges are shown in U.S. Pat. Nos. 4,488,187 to Alaimo; 4,503,474 to Nigam; 4,504,879 to Toldi, et al.; 4,683,506 to Toldi, et al.; 4,717,981 to Nigam, et al; 4,722,012 to Toldi, et al.; 4,864,452 to Thompson, et al.; 4,870,518 to Thompson, et al.; 4,864,437 to Couse, et al.; 4,920,462 to Couse, et al.; 4,965,685 to Thompson, et al.; and 4,965,691 to Iftikar, et al. Although optical disks are possible, usually such flexible (floppy) and rigid (hard) disks are coated with suitable magnetic media, for writing data and reading data therefrom. Each disk is surrounded by a housing designed to prevent contamination or damage to the magnetic media of the disk. Some floppy disk cartridges just have a window to allow access, but for a rigid or hard disk cartridge, the housing must have an access shutter or other type of door to prevent contamination or damage. The shutter is opened when the cartridge is inserted into a disk drive mechanism, to allow the read/write heads access to the disk, and closed when the cartridge is ejected. The heads move in and out linearly or arcuately across the disk. In floppy disk drives, the heads are designed to lightly touch the magnetic media. In hard disk drives, the heads float on a thin layer of air so they never touch the disk while it is spinning. Because of the head contact, floppy disks tend to wear out after a short time and the drives occasionally need their heads cleaned, while hard disks can last the lifetime of the computer to which they are connected. In hard disk drives, environmental contamination may be reduced by providing seals about the access shutter and adjacent a hub used to spin the disk.

Generally, the requirements for a disk cartridge are: protect the disk from damage and contamination, provide access for the read/write heads on both sides of the contained disk, provide access for drive means to spin the disk, provide rigidity sufficient to assure that normal stresses do not cause the housing to bend and come into contact with the disk, and do all of this in minimum volume. In addition, some sort of mechanism is usually provided to retain the shutter closed except when the cartridge is in the relative clean and safe environment within a disk drive. Cartridges typical of those available in the prior art are disclosed in U.S. Pat. Nos. 4,864,452 and 4,503,474. The cartridge arrangement shown in the '474 patent is for use with a disk drive containing heads that are movable in relationship to the disk by means of a linear device, such as a stepper motor or a linear voice coil motor, which are generally expensive and not particularly versatile or fast. The cartridge shown in the '452 patent is for use with a radial arm voice coil actuator which is economical and efficient, but requires a larger opening and are more difficult to align from drive to drive.

The housings of hard disk cartridges tend to be constructed from plastic or fiber material which must be relatively thick to withstand day-to-day abuse. The housing also must be relatively thick to support a shutter and to allow the insertion of the read/write heads within the sides thereof. The shutter of such housings usually open an edge because they cannot provide enough structural support to allow a corner to be missing. The resulting cartridges are bulky, heavy and have dimensions which are too big to fit into a shirt pocket.

Modern floppy disk drives merely require insertion of a cartridge through a slot and motors and/or solenoids within the drive thereafter properly position the cartridge in the drive. In some instances, a knob must be manipulated to connect a rotational drive motor to the disk and to bring the heads into contact with the magnetic media. Removable cartridge hard disk drives use similar motors and solenoids, but usually require the manipulation of a lever to seat and eject the cartridge, and to open and close the shutter. The motors and solenoids use electrical power, and cause excessive current drain too excessive for battery powered laptop and notebook personal computers.

Therefore, there has been a need to provide a disk drive with a removable cartridge which is robust, protects the disk therewithin from contamination or physical damage, is small and thin, is capable of operating quickly at extremely high densities, and which uses almost no electrical power for cartridge insertion and ejection, nor requires a complex series of manual manipulations to establish a mechanical interface between the cartridge and the disk drive.

SUMMARY OF THE INVENTION

The present invention is a mechanical interface between a small, thin, high density, hard disk cartridge and a disk drive. The cartridge includes a hard disk mounted for spinning within a housing. Prototype models of the present disk drive, with its matching cartridge, allow the storage of over 100 megabytes of data with a 10 millisecond average access time. The cartridge requires a generally rectangular area, about 2¾" wide by 3" deep by ³⁄₁₆" thick. The cartridge includes a peripheral frame, generally the shape of ¾ of a rectangle, that is, about half of two sides and the included corner are nonexistent. The frame supports a pair of stainless steel walls on each side of a disk centered therewithin, the double stainless steel walls giving the cartridge extreme rigidity and also providing magnetic shielding to the disk. The walls and frame define a window extending about 90° around the periphery of the rectangle and inwardly almost to the hub of the disk to expose the ring shaped read/write areas of the disk. A shutter is mounted to pivot between a closed position where the disk is totally enclosed, and an open position where free access is provided for read/write heads through the window. The shutter has an outer periphery, with two inwardly extending walls which extend between the inner/outer sheets on both sides. The shutter and the housing interact to provide labyrinth seals to prevent contamination from entering the interior of the housing and damaging the disk. The sidewalls of the shutter, like the cartridge walls, preferably are made from thin stainless steel for rigidity and also to provide magnetic shielding. The arcuate shaped outer periphery is concentric with the outer cylindrical edge of the disk so that it can retract within the housing in a minimal space. By having an entire corner of the cartridge openable without sidewalls to interfere with the action of the read/write heads of the disk drive, and by using a rigid double wall construction, the cartridge can be extremely thin, requiring little clearance for the disk.

A positive locking mechanism is provided between the housing and the shutter. When the cartridge is inserted in the disk drive for operation, the locking mechanism is engaged by an arm within the disk drive to both unlock the shutter and rotate it back against a spring. The spring is preloaded to urge the shutter closed and, with the locking mechanism, to retain it in the closed position when the cartridge is outside the drive.

One of the pairs of housing walls includes a hub hole therethrough so that the hub of the disk can be engaged by a spindle which is extended into magnetic contact therewith when the cartridge is inserted in the disk drive. Abutment surfaces are provided on the hub and about the hub hole for securing the disk in a stable position when it is removed from the disk drive. Biased wedges force the abutment surfaces together when the cartridge is removed from the disk drive. Secondary magnetic retention means are provided in association with the abutment surfaces to hold them together during transaction periods when the wedges have not fully engaged the disk.

Thus, it is an object of the present invention to provide a high density data storage device in a minimal envelope.

Another object is to provide a user friendly insertion and ejection interface between a hard disk cartridge and a disk drive which is economical to manufacture, reliable in service and which requires almost no electrical power.

Another object is to provide a manually insertable removable hard disk cartridge and the interface mechanism therefore.

Another object is to provide a removable hard disk cartridge and a disk drive which allows both to be extremely thin and small.

Another object is to provide a positive lock interface between the shutter and housing of a removable hard disk cartridge.

These and other objects and advantages of the present invention will become apparent to those skilled in the art after considering the following detailed specification, together with the drawings, wherein:

BRIEF DESCRIPTION OF THE DRAWINGS

FIG. 2 is a top plan view of the disk drive of FIG. 1 with its top cover removed and a cartridge partially inserted therein;

FIG. 3 is a top plan view similar to FIG. 2 with the cartridge fully inserted in the disk drive and the heads thereof in position to read or write data;

FIG. 7A is an enlarged cross-sectional view taken on line 7A—7A in FIG. 6A, showing the interaction between the disk and disk restraint means;

FIG. 7B is an enlarged cross-sectional view of a portion of the disk restraint means in the released position;

FIG. 8A is an edge view of the present cartridge with its shutter and disk removed;

FIG. 8B is a cross-sectional edge view of the present cartridge with its disk and shutter removed;

FIG. 9A is an enlarged cross-sectional edge view of the cartridge hub area;

FIG. 9B is a cross-sectional view of the spindle, hub, and shutter return spring area of the cartridge when it is in use;

FIG. 9C is an enlarged view of the hub hole looking outwardly;

FIG. 9D is an enlarged cross-sectional view taken at line 9D—9D of FIG. 9C;

FIG. 10 is an enlarged top view of the shutter as it engages the shutter opening mechanism in FIG. 2;

FIG. 11 is a front edge view of the shutter;

FIG. 12 is an enlarged cutaway perspective view of the edge of the shutter showing shutter locking means thereon;

FIG. 13A is an enlarged detail view of the underside of the shutter locking means;

FIG. 13B is an enlarged detail edge view of the outer side of the shutter locking means of the disk drive;

FIG. 17 is a side view of the bezel arrangement on the disk drive which allows insertion and ejection of the present cartridge;

FIG. 18 is a front view of the disk drive bezel;

FIG. 19 is a top detail view of the spring area of a modified cartridge; and

FIG. 20 is a cross-sectional view taken on line 20—20 of FIG. 19.

DETAILED DESCRIPTION OF THE SHOWN EMBODIMENT

Figure 1:
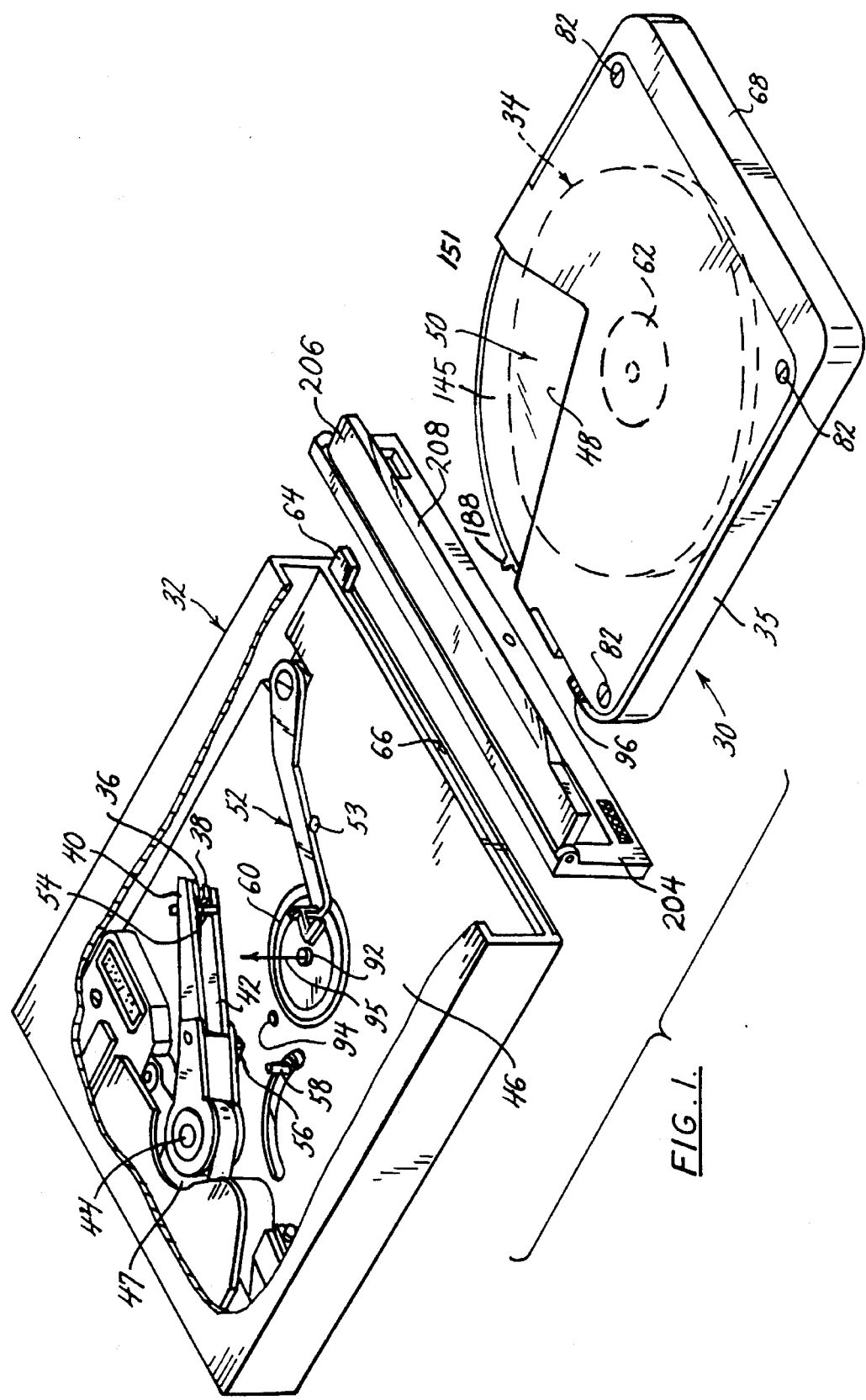
FIG. 1 is a partially cutaway perspective view of the cartridge of the present invention in position to be inserted into a disk drive.

Referring to the drawings more particularly by reference numbers, number 30 in FIG. 1 refers to a hard disk cartridge constructed according to the present invention. Such cartridges store digital data in magnetic media, although the cartridge could be used with flexible magnetic media and optical media. The removable cartridge 30 is for use with the disk drive 32. In FIG. 1, the cartridge 30 is shown positioned for insertion into the disk drive 32. Although the cartridge 30 is shown in its normal horizontal position, and hereinafter unless otherwise stated, such positioning is assumed, the cartridge 30 and disk drive 32 can be used in any orientation with respect to gravity. The cartridge includes a disk 34, which is surrounded by a housing 35 to prevent physical damage or contamination thereof. Since data is placed on very small areas of the 10 disk 34 with great precision, contamination, such as 0.1-to-0.3 micron particles, can quickly destroy the disk 34. Therefore, the housing 35 completely surrounds the disk 34 when the cartridge 30 is outside the drive 32 and exposed to the elements, as shown in FIG. 1. However, for use, the disk 34 must be accessible to read/write heads 36 and 38 in the drive 32. The heads 36 and 38 are positioned at the ends of arms 40 and 42, respectively, which rotate together about a pivot 44 on the base 46 of the drive 32 and are driven by a rotary voice coil actuator 47.

A window 48 in one corner of the housing 35 provides access for the read heads 36 and 38 of the disk 34. The window 48 normally is covered by a shutter 50 when the cartridge 30 is outside the drive 32. The shutter 50 is biased toward its closed position and latched closed when out of the drive 32. As shown in FIGS. 2 and 3, the shutter 50 is automatically opened during insertion and closed during ejection of the cartridge 30 from the disk drive 32 by a shutter opener arm 52. The shutter opener arm 52 normally is biased against a stop 53 so that it tends to remain in the ready position shown in FIG. 1. The cartridge 30 is inserted in the drive 32 by application of manual insertion force on the cartridge. As the cartridge 30 is inserted, the arm 52 engages the shutter 50 when the cartridge 30 is in the partially inserted position shown in FIG. 2. Thereafter the shutter opener arm 52 unlatches the shutter 50 and opens it as the cartridge 30 moves to the position shown in FIG. 3. When the shutter 50 has been opened, the arms 40 and 42 can position the heads 36 and 38 anywhere in the data storage area of the disk 34 for read and write operations. It should be noted that normally the arms 40 and 42 are parked and magnetically retained on a double sided ramp 54 by a magnet 55 to prevent damage due to impact. When a cartridge 30 is not in the drive 32, the arms 40 and 42 are locked on the ramp 54 by a retention lever 56. The lever 56 contacts a cam 57 on the actuator 47 to maintain the arms 40 and 42 on the ramp 54 in the locked positions shown until the cartridge 30 is nearly fully inserted in the disk drive 32. Then movement of an insertion/ejection pin 58, positioned for engagement with the back edge 59 of the housing 35 and mechanically linked to the lever 56, moves the lever 56 out of its locking position.

When the cartridge 30 is fully inserted within the drive 32, the spindle 60 thereof, is extended into engagement with the hub 62 of the disk 34. The spindle is permanently magnetized. The hub 62 is constructed from material susceptible to magnetic attraction and magnetically engages with the spindle 60 when they are moved close to each other. Thereafter, the spindle 60 rotates the disk 34 as is required for operation.

The cartridge 30 can be ejected from the drive 32 by software commands, through the use of a manual eject button 64, or by inserting a pin in an emergency eject hole 66 to directly move the release mechanism within the drive 32. When released, spring energy stored when the cartridge 30 was inserted is applied to the pin 58, which moves the cartridge 30 partially out of the drive 32 to a position where it can be manually removed therefrom. The ejection is also assisted by spring energy stored when the shutter 50 and the shutter opener arm 52 were pivoted during insertion. Because of the angles involved, the force of the spring energy acts to eject the cartridge 30 most strongly near the end of the ejection cycle.

The areas of the disk 34 on which data is written and read are never supposed to come into physical contact with other structure, because such physical contact causes damage to the very carefully applied magnetic material thereon. It is the prime function of the housing 35 and the shutter 50 to assure that no such contact ever occurs, yet allow free access by the read/write heads.

Figure 4:
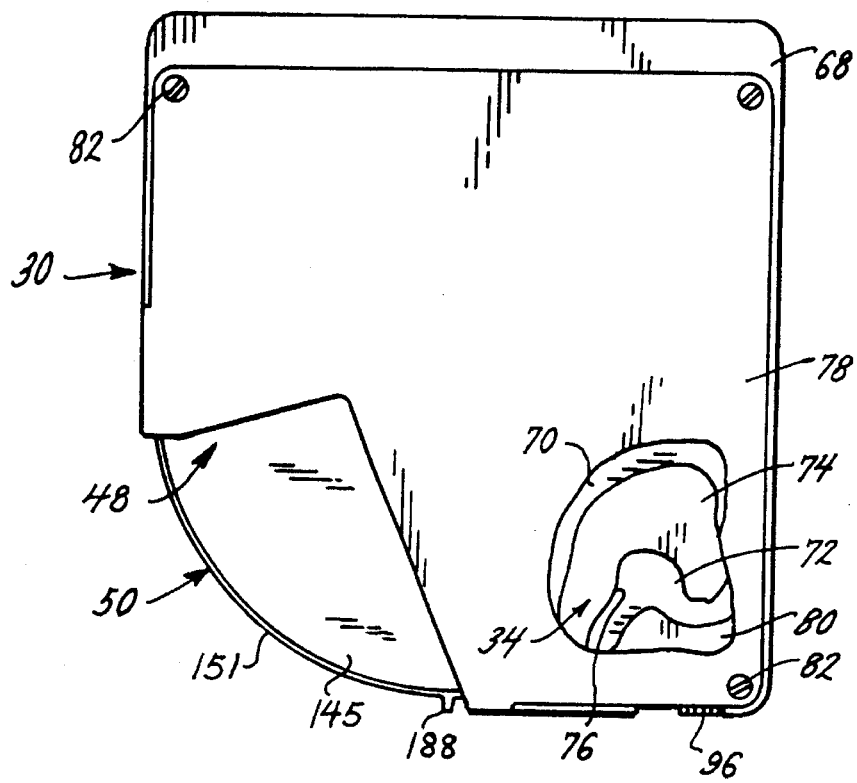
FIG. 4 is a top plan view of the cartridge of the present invention with its shutter in its closed position.
Figure 5:
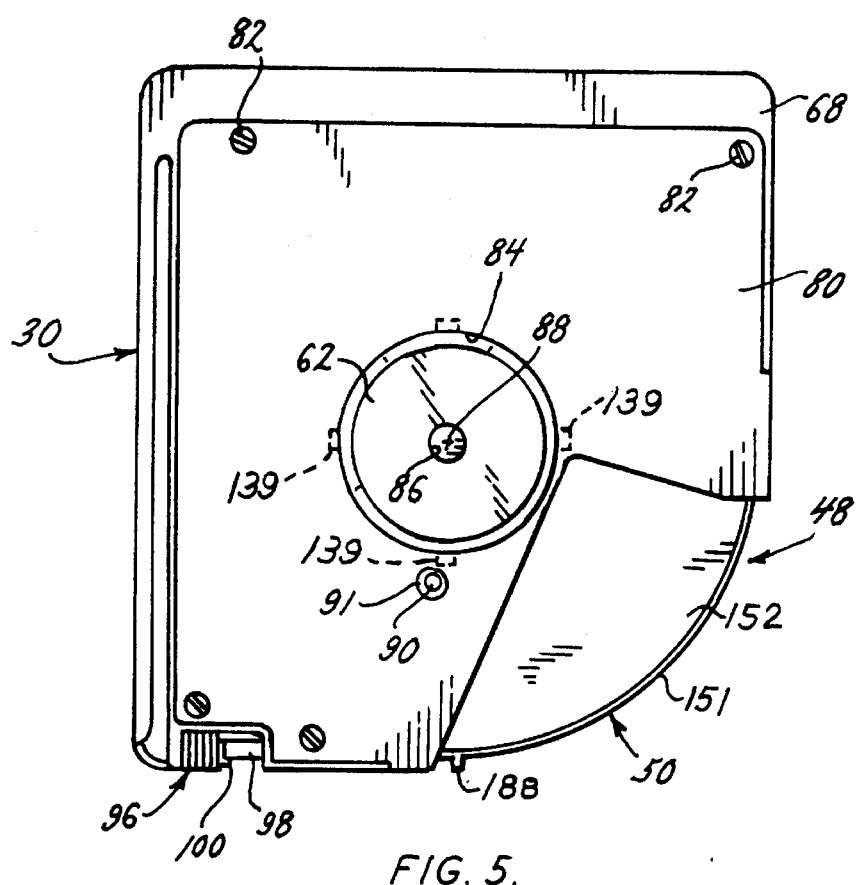
FIG. 5 is a bottom plan view of the cartridge of FIG. 4.

The cartridge 30 is shown in top plan view in FIG. 4 and in bottom plan view in FIG. 5. The housing 35 thereof includes a peripheral frame 68 which extends about 270° around the disk 34. An upper inner sheet 70 and a lower inner sheet 72 are attached to the frame 68, spaced from and generally parallel to, the upper and lower surfaces 74 and 76 of the disk 34. The upper and lower inner sheets 70 and 72 are permanently secured to the frame 68 by means such as screws, glue or fusion. The frame 68 also has upper and lower outer sheets 78 and 80 connected thereto by means such as the screws 82, although like the inner sheets 70 and 72, the outer sheets 78 and 80, may be glued or fused to the frame 68. The outer sheets 78 and 80 also may be formed as the end portions of a single U shaped member. Normally the frame 68 is constructed from plastic material, whereas the sheets 70, 72, 78 and 80 are preferably constructed from a strong magnetic shielding material, such as stainless steel. The double wall stainless steel construction tied together by the peripheral frame 68 provides a rigid housing 35 to prevent the aforementioned flexing, which might otherwise allow contact between the disk surfaces 74 or 76 and the inner sheets 70 or 72. The rigidity enables the housing 35 to be very thin with very small, internal clearances and while preventing disk damage under all but the most abusive conditions.

As shown in FIG. 5, the lower inner and outer sheets 72 and 80, define a hub hole 84 through which the hub 62 of the disk 34 extends. The hub 62 includes a cylindrical centering orifice 86 aligned with the normal rotational axis 88 of the disk 34. The orifice 86, in combination with a cylindrical locating hole 90 with a chamfered outer end 91 that also extends through the lower outer sheet 80, allows the drive 32 to precisely maintain the position of the disk 34 within the housing 35 as the disk 34 is spun by the spindle 60 as shown in FIG. 1. The spindle 60 includes a protrusion 92 which engages the orifice 86, when the spindle 60 is raised in its operating position after the cartridge 30 is fully inserted. Both the spindle 60 and a locating pin 94 move upwardly in the direction of arrow 95 (FIG. 1) when the cartridge 30 is fully seated within the drive 32 to complete the positioning process. The chamfered outer end 91 assists in seating the locating pin 94 within the cylindrical locating hole 90.

Figure 6A:
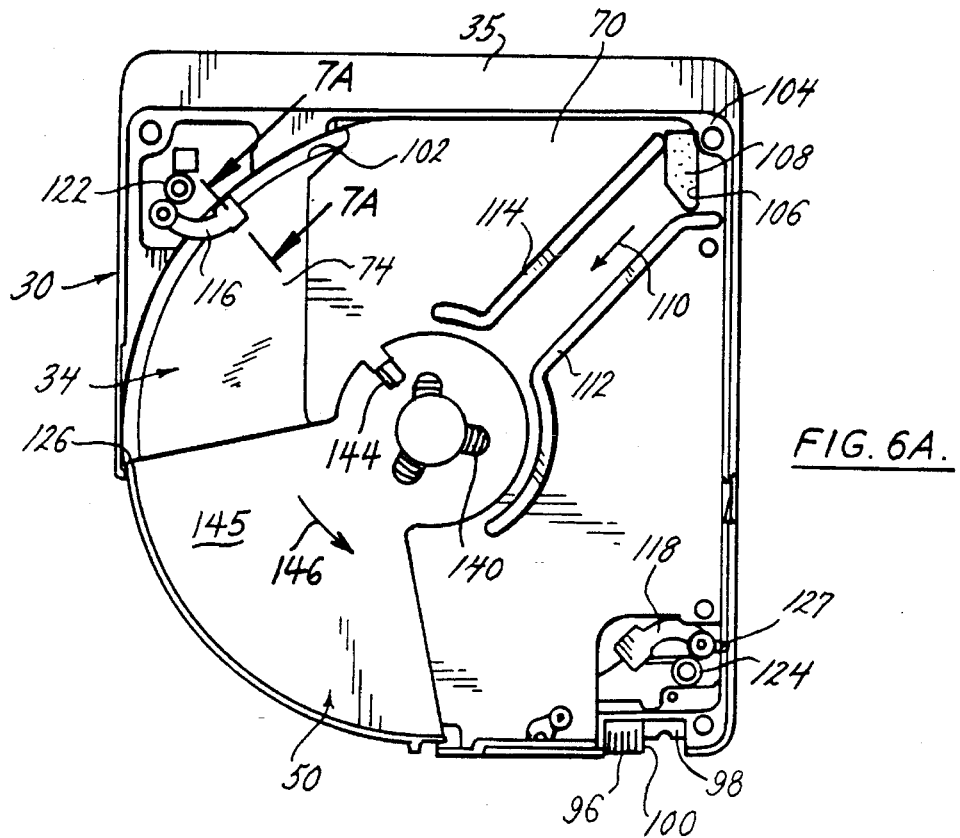
FIG. 6A is a top plan cross-sectional view of the cartridge of FIGS. 4 and 5, with its top cover sheet removed showing positioning and details of disk restraint means therein.
Figure 6B:
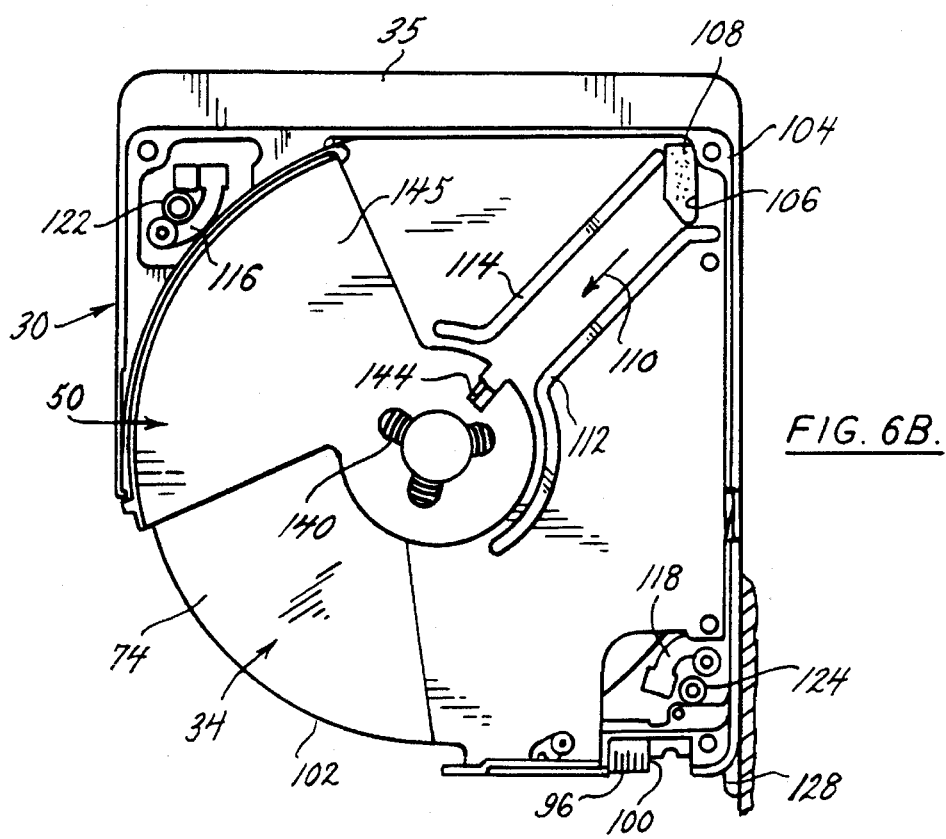
FIG. 6B is a top plan view similar to FIG. 6A but with the shutter in its open position.
Figure 15:
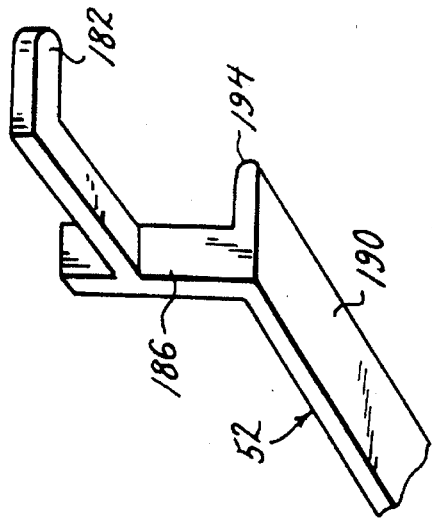
FIG. 15 is an enlarged perspective view of the tip of the shutter release lever of FIG. 14.
Figure 14:
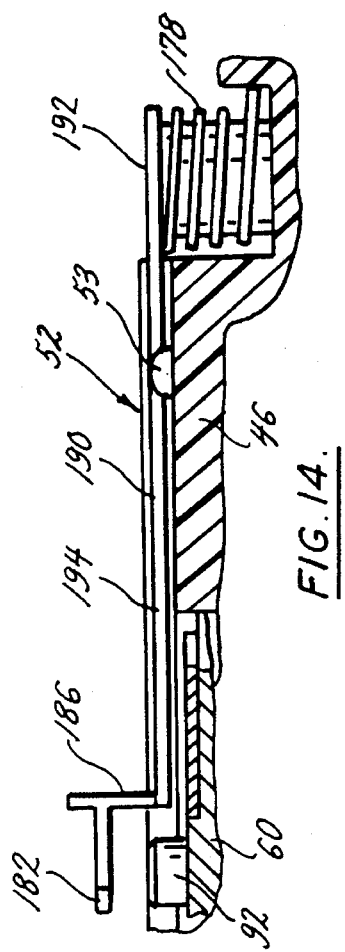
FIG. 14 is a side detail view of the shutter release lever in position over the drive spindle to engage a closed shutter.
Figure 16:
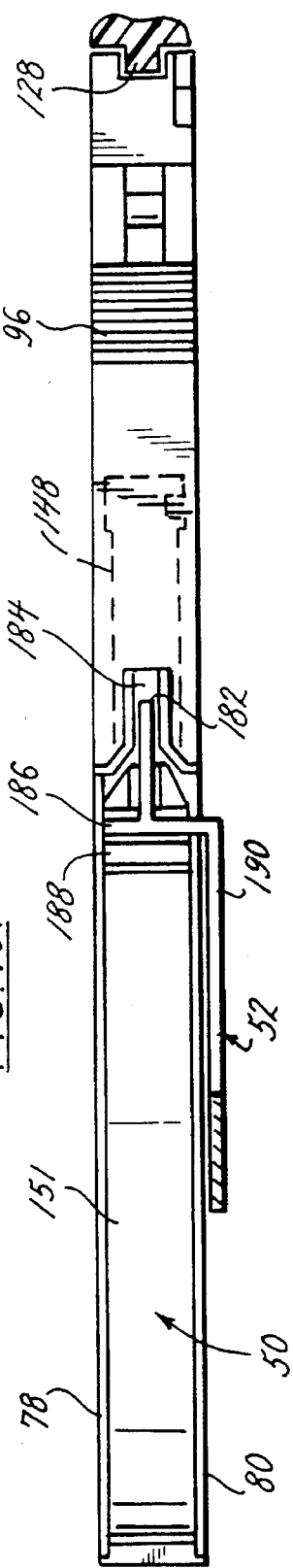
FIG. 16 is an enlarged edge view showing the cartridge as the shutter release lever comes into engagement therewith.

The housing 35 also includes a write protect slider 96, which is retained on a track 98 having a ridge 100 thereacross to establish two stable positions of the slider 96, either the position shown in FIGS. 4 and 5 wherein writing would normally be enabled, or the position shown in FIGS. 6A and 6B where disk writing is prohibited.

When the disk 34 is spinning, the viscous effects of air boundary layers adjacent its upper and lower surfaces 74 and 76, forces air outwardly causing a relatively low pressure area to form about the axis 88 of the disk with high pressure areas being generated adjacent to the edge 102 of the disk 34. Some of the high pressure air is entrapped in the corner 104 of the cartridge 30 opposite the shutter window 48. Each of the inner sheets 70 and 72 of the cartridge 30 include a sidewardly facing passageway 106, which retains a filter element 108. The filter element 108 is sized to remove particles as small as 1.5 microns. The clean air, having been forced through the filter element 108 by the pressure difference, then flows as shown by arrow 110 back toward the axis 88 for recirculation. To assure proper flow, guide walls 112 and 114 are positioned between the inner and outer sheets 70 and 78, and 72 and 80, which extend from the filter element 108 toward the axis 88. The walls 112 and 114 usually are constructed from a strip of plastic which in addition to guiding air, assures proper spacing of the sheets 70 and 78, and 72 and 80 to allow pivoting of the shutter 50.

When the cartridge 30 is not in use, it is desirable to restrict movement of the disk 34 therewithin to assure that impact forces applied to the cartridge 30 do not momentarily cause the surfaces 74 and 76 of the disk to come in contact with the inner sheets 70 and 72. Therefore, a disk immobilizing mechanism is provided. The disk immobilizing mechanism includes a pair of arms 116 and 118 pivotally mounted to the frame 68. As shown in FIG. 7A with respect to arm 116, each arm 116 and 118 has a generally wedge shaped tip 120 with a flat surface 121 of a much lower angle thereon. The tips 120 move into engagement with the edge 102 of the disk 34 to force it downwardly toward the lower inner sheet 72, when the cartridge 30 is removed from the drive 32. Each arm 116 or 118 is biased to that position by a spring 122 or 124, respectively. The flat surface 121 is to prevent a user from being able to push on the hub 62 and back drive the arms 116 and 118 against the biasing of the springs 122 and 124 to release the disk 34. Of course, the arms 116 and 118 must be disengaged from the edge 102 of the disk 34 before the disk 34 is spun. In the case of arm 116, it is positioned to be engaged by the inner edge 126 of the shutter 50 when the shutter 50 is pivoted from its closed position shown in FIG. 6A, to its open position shown in FIG. 6B. The opening movement of the shutter 50 forces the arm 116 back against its spring 122 and removes the tip 120 from engagement with the edge 102 of the disk 34. The other arm 118 includes a back side lever 127, which, as clearly shown in FIG. 7B, engages and is rotated by a guide rail 128 within the disk drive 32 as the cartridge 30 is inserted therein. The lever 127 rotates the arm 118 in the direction of arrow 130 so that its tip 120 is also removed from the edge 102 of the disk 34. When the cartridge 30 is removed from the disk drive 32, the shutter 50 closes, disengaging it from the arm 116 which rotates back to the position shown in FIG. 6A. At the same time, the rail 128 disengages from the lever 127, so that the spring 124 forces the tip 120 of the arm 118 back in engagement with the edge 102 of the disk 34 to force the disk 34 downwardly. The two arms 116 and 118 are positioned at opposite corners of the cartridge to evenly force the disk downwardly so that it does not tip or jam.

As shown in FIGS. 8A and 8B and FIGS. 9A, 9B, 9C, and 9D, the disk hub 62 includes a frustum shaped abutment surface 132 about its periphery. It should be noted (FIG. 9B) that the spindle protrusion orifice 86 extends completely through the hub 62, which could let contamination into the interior of the housing 35. Therefore, the orifice 86 is sealed with a self adhesive foil patch 134. The hole 84 in the lower inner and outer sheets 72 and 80 has a plastic abutment ring 136 therein, which includes a frustum shaped radial abutment surface 138 facing the abutment surface 132 for engagement therewith. When the disk 34 is forced downwardly by the arms 116 and 118, the frustum surfaces 132 and 138 assure centering of the hub 62 within the hole 84.

When the cartridge 30 is inserted in or ejected from a disk drive 32 that does not have a horizontal orientation, it is possible that the disk 34 undesirably will move sidewardly in the housing 35 between the time it is immobilized by the arms 116 and 118, and the time it is engaged by the spindle 60. Therefore, magnetic wedges 139 are fastened in the abutment ring 136 to retain the hub 62 until either the arms 116 and 118 secure the disk 34 or the spindle 60 engages the hub 62. The magnetic field of the magnetic wedges 139 make only a small loop away therefrom. Sufficient clearances are maintained when the spindle 60 has extended, engaged the hub 62 and moved the two abutment surfaces 132 and 138 apart, to avoid eddy current losses that otherwise would be generated by moving a conductor in the magnetic fields of the wedges 139. Although separated magnetic wedges 139 are shown, the abutment ring 136 could be constructed with permanent magnetic particles distributed therein to provide the same effect.

The normal position for the shutter 50 is closed as shown in FIGS. 4, 5 and 6A. This is because it is biased closed by means of a spring 140 acting between the shutter 50 and the housing 35. As shown in the embodiment of FIG. 10, the spring 140 acts between a slotted member 142 connected to the upper inner sheet 70 and a nib 144 on the upper shutter sheet 145 of shutter 50. The spring 140 is pre-tensioned to urge the shutter 50 in the direction of arrow 146. The shutter 50 is maintained in this closed position by the cooperation of a T-shaped spring catch 148 attached to the frame 68 and a pawl 150 formed integrally with the arcuate shutter rim 151 positioned between the upper shutter sheet 145 and the lower shutter sheet 152. The shutter 50 pivots about the axis 88. Both the upper and lower shutter sheets 145 and 152 preferably are constructed from stainless steel sheet covered with a low friction coating containing polytetrafluoroethylene, which may be applied to the inner and outer sheets 70, 72, 78 and 80 as well. The sheets 145 and 152 are partially sandwiched between the sheets 70 and 78, and 72 and 80 and the low friction coatings (not shown) reduce friction therebetween. The upper shutter sheet 145 includes a cylindrical bearing surface 153 which rides on a thin axle 154 attached to the upper inner sheet 70. The lower shutter sheet 152 includes a ring portion 155 which rotates on an outer cylindrical surface 156 of the ring 136.

As shown in FIG. 12, the pawl 150 has a bifurcated abutment surface 157 formed on the back side of inwardly facing teeth 158 and 160. As shown in FIGS. 13A and 13B, the abutment surfaces 157 engage with the underside 162 of the T-head 164 of the T-shaped spring catch 148. The head 164 can easily reach this position, because when the shutter 50 closes, the arms 166 and 168 slide up the wedge surfaces 170 and 172 on the inner side of the teeth 158 and 160 and then drop into the slot 173 behind the teeth 158 and 160.

The shutter opener arm 52 in the disk drive 32 is maintained in the position shown in FIG. 10 against the stop 53 as aforesaid, by a biasing spring 178, which urges the arm 52 in the direction of the arrow 180. When the cartridge 30 is inserted into the disk drive 32, the inwardly facing tang 182 on the end of the arm 52 extends through a slot 184 in the cartridge frame 68, which provides access to the T-shaped spring catch 148. As shown in FIG. 10, the tang 182 depresses the catch 148, moving the arms 166 and 168 out of engagement with the bifurcated abutment surface 157. The tang 182 is supported by a sidewardly extending arm 186, which engages a buttress protrusion 188 extending radially outwardly from the shutter rim 151. Further motion of the cartridge 30 into the disk drive 32 and the abutment between the arm 186 and the buttress protrusion 188 causes the shutter 50 to rotate back against the force of the spring 140 to open the window 48 and provide access for the heads 36 and 38 to read and/or write on the disk 34. It should be noted that the portion 190 of the arm 52 between its pivot 192 and the arm 186 is offset below the cartridge 30 and has an edge 194 facing the cartridge 30 which is beveled so that the cartridge 30 can slide thereover without overcoming the spring 178 and forcing the arm 186 out of abutment with the buttress 188.

When the cartridge 30 is ejected from the disk drive 32, the arm 52 rotates to the position shown in FIG. 10 and thereafter movement of the cartridge 30 in the direction of arrow 196 causes the tang 182 to disengage from the spring catch 148, allowing the spring catch 148 to reengage with a pawl 150 to lock the shutter 50 in its closed position. Such ejection can be accomplished either through the use of software, a keyboard command, the manual pushing of the eject button 64 or for emergencies, the insertion of a pin through the emergency eject pinhole 66 in the bezel 204. The pin hole 66 is located beneath a spring loaded bezel cover 206 and allows the operator to directly physically access mechanical eject mechanism 207 within the disk drive 32 to trip it and eject the cartridge 30 using spring energy stored when the cartridge 30 was inserted in the drive 32. The cover 206 has a lip 208 useful to raise the cover 206 when inserting or ejecting a cartridge 30. However, the spring loading of the cover 206 is not strong enough to resist the ejection mechanism 207 within the disk drive 32.

FIGS. 19 and 20 show a modified cartridge 220 in which the spring 140, instead of being between the upper inner sheet 70 and the hub 62, is positioned in a cylindrical depression 222 in a modified upper inner sheet 224 between the upper inner sheet 224 and the outer sheet 78. In FIG. 20, the disk 34 is shown in its normal operating position. The inner end 226 of the spring 140 is trapped between a pair of upstanding tangs 228 and 230, which are punched and formed out of the upper inner sheet 224, as shown. The opposite end 232 of the spring 140 is preloaded against an upstanding tang 234 on the modified shutter 236 so that the spring 140 tends to maintain the shutter 236 in its closed position as occurs with shutter 50 in cartridge 30.

The shutter 236 whose upper sidewall 238 is shown, includes a plurality of tabs 240 which extend downwardly from a ring portion 241 thereof to ride in the inner cylindrical surface 242 of the cylindrical depression 222 for pivoting therein. It should be noted that the distance, as shown by arrow 244, between the bottom 246 of the cylindrical depression 222 and the bottom 247 of the cylindrical depression 248 on the inner side 250 of the hub 62, is slightly less than the distance, shown by arrow 252, between the upper inner sheet 224 and the disk 34. This assures that, if for some reason, the disk 34 gets jostled toward the inner upper sheet 224, the disk surface 74 cannot make contact with the inner upper sheet 224. As in cartridge 30, the hub orifice 86 is sealed by a self adhesive foil patch 134, which is positioned on the bottom 247 of the cylindrical depression 248 on the inner side 250 of the hub 62. The modified cartridge 220 is desirable, since the spring 140 is easier to position and preload during assembly than it is in cartridge 30.

Thus, there has been shown and described a novel interface between a drive and removable storage media protected by a surrounding housing, which fulfills all the object and advantages sought therefor. Many changes, alterations, modifications and other uses and applications of the subject interface will become apparent to those skilled in the art after considering the specification, together with the accompanying drawings. All such changes, alterations and modifications which do not depart from the spirit and scope of the invention are deemed to be covered by the invention, which is limited only by the claims that follow:

We claim
1. A data storage device including:
   a removable disk cartridge having:
      a disk for data storage having:
         an axis of rotation;
      a housing surrounding said disk, said housing having:
         a window therein to allow access to said disk;
         a shutter attached to said housing for rotation generally about said axis of rotation, said shutter having:
            an open position allowing access to said disk;
            a closed position closing said window;
            an arcuate outer peripheral edge portion;
            first and second side walls on opposite sides of said arcuate outer peripheral edge portion; and
            an abutment surface positioned across said arcuate outer peripheral edge portion; and
         lock means for releasably retaining said shutter in said closed position, and
   a disk drive for removably retaining said removable disk cartridge, said disk drive including:
      an opening for insertion and removal of said removable disk cartridge therein;
      a pivoting arm near said opening, said pivoting arm including:
         an outer end having:
            a finger positioned and shaped for engagement with said lock means to unlock said lock means as said removable disk cartridge is being inserted in said disk drive; and
            an abutment lever shaped and positioned for engagement with said abutment surface as said finger is unlocking said lock means to move said shutter to said open position as said cartridge is further inserted in said disk drive.

2. The data storage device as defined in claim 1 wherein said housing further includes:
   a housing peripheral edge portion;
   first and second housing side portions, said housing peripheral edge portion and said first and second housing side portions defining said window, wherein said shutter arcuate outer peripheral edge portion includes:
   a first end, and wherein said lock means includes:
      a pawl surface on said arcuate outer peripheral edge portion extending inwardly toward said axis; and
      a spring member connected to said housing, said spring member having:
         a catch portion positioned for engagement by said pawl surface to releasably retain said shutter in said closed position; and
         a spring member abutment surface thereon positioned for abutment by said finger of said pivoting arm for urging said catch portion out of engagement with said pawl surface to unlock said shutter, so that said shutter can be moved to said open position by said pivoting arm.

3. The data storage device as defined in claim 2 wherein said housing peripheral edge portion further includes:
   an opening adjacent said spring abutment surface of said spring member to allow disconnecting access by said finger of said pivoting arm thereto, said opening of said housing peripheral edge portion being sealed by said spring member when said shutter is in said closed position retained by said lock means.

4. The data storage device as defined in claim 3 wherein said housing peripheral edge portion opening adjacent said spring abutment surface is a Y-shaped slot, and wherein said first end of said arcuate outer peripheral edge portion of said shutter has:
   a pointed tip for centering engagement with said Y-shaped slot when said shutter is closed.

5. The data storage device as defined in claim 1 wherein said arcuate outer peripheral edge portion of said shutter has:
   a first end; and
   a second end, said first end including:
      a bifurcated pawl surface; and
      a bifurcated wedge surface, and wherein said housing includes:
   a housing peripheral edge portion including:
      a spring member connected thereto having:

a T-shaped catch portion positioned for bending by said bifurcated wedge surface when said shutter is moving toward said closed position and for engagement by said bifurcated pawl surface to releasably retain said shutter in said closed position; and an abutment surface thereon for urging said T-shaped catch portion out of engagement with said bifurcated pawl surface, so that said shutter can be moved to said open position, said bifurcated pawl surface, said bifurcated wedge surface, and said spring member forming said lock means.

6. The data storage device as defined in claim 1 wherein said housing includes:

shutter biasing means positioned centrally with respect to said disk and acting between said housing and one of said shutter side walls to urge said shutter toward said closed position.

7. The data storage device as defined in claim 6 wherein said housing includes:

inner and outer first side walls; and inner and outer second side walls; and wherein said first shutter side wall is positioned between said inner and outer first housing side walls and said second shutter side wall is positioned between said inner and outer second side walls.

8. The data storage device as defined in claim 7 wherein said shutter biasing means include:

a preloaded spring member urging said shutter to said closed position, said preloaded spring member being positioned between said housing inner first side wall and said housing outer first side wall generally concentric to said disk axis of rotation and acting between said housing inner first side wall and said shutter first side wall.

9. The data storage device as defined in claim 7 wherein said shutter biasing means include:

a preloaded spring member urging said shutter to said closed position, concentric to said disk axis of rotation and acting between said housing inner first side wall and said shutter first side wall.

10. The data storage device as defined in claim 1 wherein said shutter further includes:

shutter biasing means to urge said shutter to said closed position; and a radially outwardly extending buttress member for engagement with said abutment lever of said pivoting arm to pull said shutter to said open position against the urging of said shutter biasing means as said removable disk cartridge is inserted in said disk drive.

11. The data storage device as defined in claim 10 wherein said opening in said disk drive for insertion and removal of said removable disk cartridge includes:

a middle area, and wherein said disk drive further includes:

a stop; and arm biasing means to urge said pivoting arm against said stop with said outer end thereof generally aligned with said middle area of said opening and in position for engagement with said removable disk cartridge when said cartridge is inserted in said disk drive through said opening.

12. The data storage device as defined in claim 1 wherein said pivoting arm further includes:

a pivot end connected to allow pivoting of said pivoting arm with respect to said disk drive; and an arm portion connecting said outer end to said pivot end, and sized and shaped so that at least a portion thereof can move adjacent said housing, said arm portion including:

upper and lower sides; and leading and trailing edges, said leading edge being curved to said upper side to assure said arm portion can move adjacent said housing as said cartridge is inserted in said disk drive.

13. The data storage device as defined in claim 1 wherein said abutment lever is upstanding from said pivoting arm and said finger extends at 90° from said abutment lever.

14. The data storage device as defined in claim 1 wherein said pivoting arm further includes:

a pivot end connected to allow pivoting of said pivoting arm with respect to said disk drive; and a generally planar arm portion connecting said outer end to said pivot portion, and sized and shaped so that at least a portion thereof can move adjacent said housing, and wherein said abutment lever is upstanding from said pivoting arm and said finger extends at about 90° from said abutment lever out of planar alignment with said generally planar arm portion.

15. A data storage device including:

a removable disk cartridge having:

a disk for data storage having:

a first frustoconical centering surface located centrally on a side thereof;

a housing in which said disk can be spun, said housing having:

a second frustoconical centering surface located facing said first frustoconical centering surface;

a window to allow access to said disk;

a shutter having:

a first position allowing access to said disk; and a second position closing said window; and lock means for releasably retaining said shutter in said second position, and a disk drive for removably retaining said removable disk cartridge, said disk drive including:

a shutter opener arm including:

an outer end having:

a key positioned and shaped for engagement with said lock means to unlock said lock means as said removable disk cartridge is being inserted in said disk drive; and a lever shaped and positioned for engagement with said shutter as said key is unlocking said lock means to then move said shutter to said first position as said cartridge is inserted further into said disk drive; and an unrestraining abutment surface thereon, and said housing further includes:

disk retention means to immobilize said disk when disengaged from said unrestraining abutment surface by forcing said first and second frustoconical centering surfaces together, said disk retention means including:

a disk retaining member mounted for movement with respect to said disk, said disk retaining member including:

a first portion having:

a wedge abutment surface positioned for contact with said disk; and a second portion positioned for contact with said unrestraining abutment surface when said cartridge is inserted in said disk drive for actuation thereby to move said wedge abutment surface out of contact with said disk; and biasing means connected to said disk retaining member to urge said wedge abutment surface into contact with said disk.

16. A data storage device including:
a removable disk cartridge having:
  a disk for data storage;
  a housing in which said disk can be spun, said housing having:
    a window to allow access to said disk;
    a shutter having:
      a first position allowing access to said disk; and
      a second position closing said window; and
    lock means for releasably retaining said shutter in said second position, and
a disk drive for removably retaining said removable disk cartridge, said disk drive including:
  a shutter opener arm including:
    an outer end having:
      a key positioned and shaped for engagement with said lock means to unlock said lock means as said removable disk cartridge is being inserted in said disk drive; and
      a lever shaped and positioned for engagement with said shutter as said key is unlocking said lock means to then move said shutter to said first position as said cartridge is inserted further into said disk drive, wherein said housing further includes:
        a first peripheral edge portion extending from said window;
        a first peripheral edge corner portion connected to said first peripheral edge portion;
        a second peripheral edge portion connected to said first peripheral edge corner portion;
        a second peripheral edge corner portion connected to said second peripheral edge portion;
        a third peripheral edge portion connected to said second peripheral edge corner portion;
        a third peripheral edge corner portion connected to said third peripheral edge portion; and
        a fourth peripheral edge portion extending to said window, said peripheral edge portions being generally linear and each of said peripheral edge corner portions subtending about 90°, and said shutter further including:
          an arcuate peripheral edge portion that rotates under said first peripheral edge portion and subtends about 90°.

17. The data storage device as defined in claim 16 wherein said disk drive includes:
a rail, and said housing includes:
a slot in said first peripheral edge portion thereof for engaging said rail, and
disk retention means to immobilize said disk including:
  a disk retaining lever pivotally mounted to said housing, said disk retaining lever including:
    a first arm having:
      a wedge abutment surface positioned for contact with said disk; and
    a second arm extending through said housing first peripheral edge portion for actuation by said rail to pivot said first arm wedge abutment surface out of contact with said disk; and
  lever biasing means connected to said disk retaining lever to urge said wedge abutment surface of said first arm into contact with said disk.

18. A data storage device including:
a removable disk cartridge having:
  a disk for data storage;
  a housing in which said disk can be spun, said housing having:
    a window to allow access to said disk;
    a shutter attached to said housing for rotation between a first position allowing access to said disk and a second position closing said window, said shutter including:
      first and second side walls on opposite sides of said disk, at least one of said side walls being mounted for rotation to said housing;
    a center;
    shutter biasing means positioned in said housing center on one side of said disk and acting between said housing and one of said side walls to urge said shutter toward said second position; and
    lock means for releasably retaining said shutter in said second position, and
a disk drive for removably retaining said removable disk cartridge, said disk drive including:
  an opening for insertion and removal of said removable disk cartridge therein;
  a pivoting arm near said opening, said pivoting arm including:
    an outer end having:
      a key positioned and shaped for engagement with said lock means to unlock said lock means as said removable disk cartridge is being inserted in said disk drive; and
      a lever shaped and positioned for engagement with said shutter as said key is unlocking said lock means to then rotate said shutter to said first position as said cartridge is inserted further into said disk drive.

19. A data storage device including:
a removable disk cartridge having:
  a disk for data storage;
  a housing in which said disk can be spun, said housing having:
    a window to allow access to said disk;
    a shutter attached to said housing for rotation between a first position allowing access to said disk and a second position closing said window, said shutter including:
      first and second side walls on opposite sides of said disk, at least one of said side walls being mounted for rotation to said housing;
    inner and outer first side walls; and
    inner and outer second side walls, said shutter first side wall being positioned between said inner and outer first side walls and said shutter second side wall being positioned between said inner and outer second side walls; and
    lock means for releasably retaining said shutter in said second position, and
a disk drive for removably retaining said removable disk cartridge, said disk drive including:
  an opening for insertion and removal of said removable disk cartridge therein;
  a pivoting arm near said opening, said pivoting arm including:
    an outer end having:
      a key positioned and shaped for engagement with said lock means to unlock said lock means as said removable disk cartridge is being inserted in said disk drive; and a lever shaped and positioned for engagement with said shutter as said key is unlocking said lock means to then rotate said shutter to said first position as said cartridge is inserted further into said disk drive.

20. The data storage device as defined in claim 19 further including:
a preloaded spring member urging said shutter to said second position, said preloaded spring member being positioned between said inner first housing side wall and said outer first housing side wall generally concentric to said disk and acting between said inner first housing side wall and said first shutter side wall.

21. The data storage device as defined in claim 19 wherein said disk has an axis of rotation, said device further including:
a preloaded helical spring member urging said shutter to said second position, generally concentric to said disk axis of rotation and acting between said inner first housing side wall and said first shutter side wall.

22. A data storage device including:
a removable disk cartridge having:
a disk for data storage having:
an axis of rotation; and
a housing in which said disk can be spun, said housing having:
a window to allow access to said disk;
a shutter attached to said housing for rotation between a first position allowing access to said disk and a second position closing said window; and
lock means for releasably retaining said shutter in said second position, and
a disk drive for removably retaining said removable disk cartridge, said disk drive including:
an opening for insertion and removal of said removable disk cartridge therein; and
a pivoting arm near said opening, said pivoting arm including:
an outer end having:
a key positioned and shaped for engagement with said lock means to unlock said lock means as said removable disk cartridge is being inserted in said disk drive; and
a lever shaped and positioned for engagement with said shutter as said key is unlocking said lock means to then rotate said shutter to said first position as said cartridge is inserted further into said disk drive, said lever having:
a midpoint;
a pivot end connected to allow pivoting of said pivoting arm with respect to said disk drive; and
an arm portion connecting said outer end to said pivot end and sized and shaped so that at least a portion thereof can move adjacent said housing, said arm portion including:
a first side for movement adjacent said housing;
a second side opposite said first side; and
leading and trailing edges, said leading edge being curved to said first side to allow said cartridge to move across said first side, said lever extending away from said first side of said pivoting arm parallel to said axis of rotation, and said key extending away from said midpoint of said lever perpendicular to said axis of rotation.

23. A data storage device including:
a removable disk cartridge having:
a disk for data storage;
a housing in which said disk can be spun, said housing having:
a window to allow access to said disk;
a shutter attached to said housing for rotation between a first position allowing access to said disk and a second position closing said window, said shutter having:
a peripheral edge portion having:
a first end;
lock means for releasably retaining said shutter in said second position, said lock means including:
a pawl surface on said shutter peripheral edge portion extending inwardly; and
a spring member connected to said housing;
a housing peripheral edge portion;
first and second housing side portions, said housing peripheral edge portion and said first and second housing side portions defining said window; and
a disk drive for removably retaining said removable disk cartridge, said disk drive including:
an opening for insertion and removal of said removable disk cartridge therein;
a pivoting arm near said opening, said pivoting arm including:
an outer end having:
a key positioned and shaped for engagement with said lock means to unlock said lock means as said removable disk cartridge is being inserted in said disk drive; and
a lever shaped and positioned for engagement with said shutter as said key is unlocking said lock means to then rotate said shutter to said first position as said cartridge is inserted further into said disk drive, said spring member having:
a catch portion positioned for engagement by said pawl surface to releasably retain said shutter in said second position; and
a key abutment surface thereon positioned for abutment by said key of said pivoting arm for urging said catch portion out of engagement with said pawl surface to unlock said shutter, so that said shutter can be moved to said first position by said pivoting arm, said housing peripheral edge portion including:
an opening adjacent said key abutment surface of said spring member to allow disconnecting access by said key thereto, said housing peripheral edge portion opening adjacent said key abutment surface is a Y-shaped slot, and wherein said shutter has:
an outer peripheral edge portion that includes:
a pointed tip for centering engagement in said Y-shaped slot when said shutter is in said second position.

24. The data storage device as defined in claim 23 wherein said housing includes:
shutter biasing means positioned in the center of said housing adjacent said disk and acting between said housing and said shutter to urge said shutter toward said second position.

25. The data storage device as defined in claim 23 wherein said opening in said disk drive for insertion and removal of said removable disk cartridge includes:
a center, and wherein said disk drive further includes:

a stop; and arm biasing means to urge said pivoting arm against said stop with said outer end thereof generally aligned with said center of said opening and in position for engagement with said removable disk cartridge when said cartridge is inserted in said disk drive through said opening.

26. The data storage device as defined in claim 23 wherein said housing includes:
   a first peripheral edge portion extending from said window;
   a first peripheral edge corner portion connected to said first peripheral edge portion;
   a second peripheral edge portion connected to said first peripheral edge corner portion;
   a second peripheral edge corner portion connected to said second peripheral edge portion;
   a third peripheral edge portion connected to said second peripheral edge corner portion;
   a third peripheral edge corner portion connected to said third peripheral edge portion; and
   a fourth peripheral edge portion extending to said window.

27. The data storage device as defined in claim 26 wherein said peripheral edge portions are generally linear and said peripheral edge corner portions subtended about 90°.

28. A data storage device including:
   a removable disk cartridge having:
      a disk for data storage;
      a housing in which said disk can be spun, said housing having:
         a window to allow access to said disk;
         a shutter attached to said housing for rotation between a first position allowing access to said disk and a second position closing said window; and
         lock means for releasably retaining said shutter in said second position, and
   a disk drive for removably retaining said removable disk cartridge, said disk drive including:
      an opening for insertion and removal of said removable disk cartridge therein;
      a pivoting arm near said opening, said pivoting arm including:
         an outer end having:
            a key positioned and shaped for engagement with said lock means to unlock said lock means as said removable disk cartridge is being inserted in said disk drive; and
            a lever shaped and positioned for engagement with said shutter as said key is unlocking said lock means to then rotate said shutter to said first position as said cartridge is inserted further into said disk drive, said shutter having:
               an outer peripheral edge portion having:
                  a first end; and
                  a second end, said first end including:
                     a bifurcated pawl surface; and
                     a bifurcated wedge surface, and wherein said housing further includes:
               a housing peripheral edge portion including:
                  a spring member connected thereto having:
                     a T-shaped catch portion positioned for bending by said bifurcated wedge surface when said shutter is moving toward said second position and for engagement with said shutter to releasably retain said shutter in said second position; and
                     an abutment surface thereon for urging said T-shaped catch portion out of engagement with said bifurcated pawl surface, so that said shutter can be moved to said first position, said bifurcated pawl surface, said bifurcated wedge surface, and said spring member forming said lock means.

29. The data storage device as defined in claim 28 wherein said first end of said outer peripheral edge portion of said shutter further includes:
   shutter biasing means to urge said shutter to said second position; and
   a radially outwardly extending buttress member for engagement with said lever of said pivoting arm to pull said shutter to said first position against the urging of said shutter biasing means.

* * * * *